(12) United States Patent
McCrea et al.

(10) Patent No.: US 6,457,302 B1
(45) Date of Patent: Oct. 1, 2002

(54) CROP DIVIDER WITH CUTTER

(76) Inventors: Thomas Edward McCrea, P.O. Box 9, Benito, Manitoba (CA), R0L 0C0; David Gary McCrea, P.O. Box 9, Benito, Manitoba (CA), R0L 0C0

( * ) Notice: Subject to any disclaimer, the term of this patent is extended or adjusted under 35 U.S.C. 154(b) by 0 days.

(21) Appl. No.: 09/657,829

(22) Filed: Sep. 8, 2000

(51) Int. Cl.$^7$ ............................................. A01D 63/04
(52) U.S. Cl. ...................................................... 56/316
(58) Field of Search .......................... 56/119, 229, 314, 56/315, 1, 218, 320

(56) References Cited

U.S. PATENT DOCUMENTS

| | | | | |
|---|---|---|---|---|
| 335,769 A | * | 2/1886 | Patterson et al. .............. | 56/316 |
| 1,301,829 A | * | 4/1919 | Foutz ........................... | 56/315 |
| 1,354,242 A | * | 9/1920 | Carrau ......................... | 56/316 |
| 2,724,940 A | * | 11/1955 | Hirschkorn ................... | 56/316 |
| 2,811,006 A | * | 10/1957 | Heth ............................ | 56/315 |
| 5,974,773 A | * | 11/1999 | Rieck et al. .................. | 56/314 |

* cited by examiner

*Primary Examiner*—Robert E. Pezzuto
(74) *Attorney, Agent, or Firm*—Frost Brown Todd LLC

(57) ABSTRACT

A crop divider for separating crop plants on one side of a line of travel from those on an opposite side of the line of travel and pushing the plants away from the line of travel to allow passage of an implement portion along a forward travel path while reducing contact of the plants with the implement portion. The crop divider comprises a vertically oriented V-shaped member adapted for mounting on the implement forward of the implement portion, the V-shaped member having an apex located substantially in the center of the travel path and facing forward, and right and left legs extending rearward and outward beyond edges of the travel path. A vertically oriented cutter is mounted on a forward edge of the apex of the V-shaped member. The crop divider is particularly suited to a canola pusher for lodging crops of the Genus Brassica.

18 Claims, 3 Drawing Sheets

CROP DIVIDER WITH CUTTER

This invention is in the field of agricultural equipment, and in particular such equipment used dividing standing crop to allow passage of a wheel br implement with reduced crop damage.

BACKGROUND

In certain agricultural field operations such as spraying, and recently pushing canola into a lodged position, it is necessary to drive an implement through a standing crop. Crop dividers are well known wherein a V-shaped divider is provided in front of a wheel to push the crop to each side and reduce the amount of crop that is pushed to the ground by the wheel.

Such crop dividers work well where the crop is standing fairly straight, however where the crop is standing at a pronounced angle the plants can be dragged and bunch up on the divider requiring the operator to stop and clear it. Also some crops, such as canola, have a plurality of laterally spreading branches and so are more susceptible to tangling and resistance as the divider moves through them and attempts to separate the plants on one side from those on the other. Cereal crops such as wheat have a single stem with a head at the top and so such tangling is much less frequent in these crops, although the presence of weeds can be problematic.

Canadian Patent Number 2,226,468 "Apparatus and Method for Use in Harvesting Crops of the Genus Brassica" to Rourke, discloses an apparatus and method for harvesting canola and similar crops by pushing same into a lodged position to prevent shattering and then harvesting with a conventional header by travelling in the direction opposite to the direction the crop is pushed.

The apparatus includes dividers for separating the crop plants as it advances through the field. In tangled heavy crops, which are common with crops such as canola, the plants with their many branches frequently engage the divider and drag, in some cases becoming uprooted, soon causing a bunch requiring the operator to stop and clear it.

SUMMARY OF THE INVENTION

It is the object of the present invention to provide a crop divider that produces less resistance to the forward motion of the implement through the field.

It is a further object of the invention to provide such a crop divider that reduces tangling and bunching of plants on the divider.

It is a further object of the invention to provide an improved apparatus for pushing canola into a lodged position for harvesting, providing less down-time for clearing bunches, and improved height control.

The invention provides, in one aspect, a crop divider for separating crop plants on one side of a line of travel from those on an opposite side of the line of travel and pushing the plants away from the line of travel to allow passage of an implement portion along a forward travel path while reducing contact of the plants with the implement portion. The crop divider comprises a vertically oriented V-shaped member adapted for mounting on the implement forward of the implement portion, the V-shaped member having an apex located substantially in the center of the travel path and facing forward, and right and left legs extending rearward and outward beyond edges of the travel path; and a vertically oriented cutter mounted on a forward edge of the apex of the V-shaped member.

The cutter at the front of the V-shaped member cuts those plants that it contacts, however the legs of the V-shaped member actually serve to part the plants prior to contact with the cutter as the V-shaped member essentially sets up a wave in front of it that parts the crop, such that many less plants are cut than if the cutter passed through the crop without a V-shaped member behind it. As portions of the cut plants generally fall to the ground and are lost, it is desirable to minimize the number of plants that are cut.

In a second aspect the invention provides an apparatus for pushing crops into a lodged position comprising a crop pushing surface inclined down and rearward from a top forward edge to a bottom trailing edge and extending perpendicular to a forward travel direction from a left end to a right end thereof. The crop pushing surface is mounted on a frame for movement in a forward direction along the ground by a vehicle mounted behind the frame to engage the crop pushing surface with a standing crop so as to push the standing crop from a standing position to a lodged position. A vertically oriented V-shaped end divider is mounted on the frame forward of the crop pushing surface at the right and left ends of the crop pushing surface, each V-shaped end divider having an apex located substantially on the respective end of the crop pushing surface and facing forwards an inside leg extending rearward in approximate conformity to the crop pushing surface, and an outside leg extending rearward of the respective end of the crop pushing surface. A vertically oriented V-shaped wheel divider is mounted on the frame forward of each wheel path of the vehicle, each V-shaped wheel divider having an apex located substantially in the center of the respective wheel path and facing forward, and right and left legs extending rearward in approximate conformity to the crop pushing surface. A vertically oriented cutter is mounted on a forward edge of the apex of each V-shaped end divider and each V-shaped wheel divider.

A gauge wheel may be mounted behind the apex of the dividers between the legs of the V to control the vertical position of the crop pushing surface.

The cutter may be a sickle cutter bar, a rotary cutter with a deflector or other cutting tool capable of shearing plants.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

Figure 1:
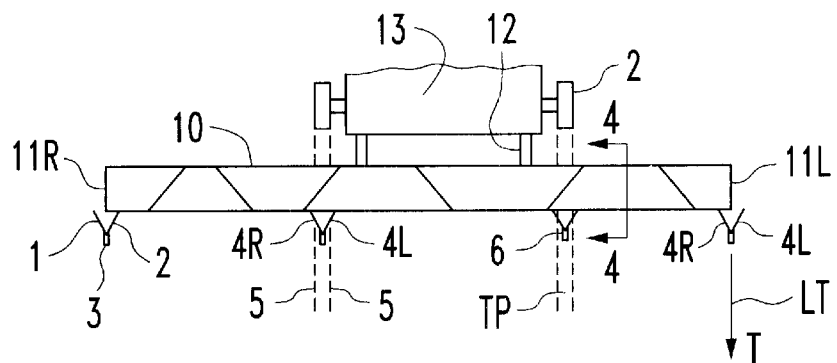
FIG. 1 is a schematic top view of a canola pushing apparatus of the invention.
Figure 2:
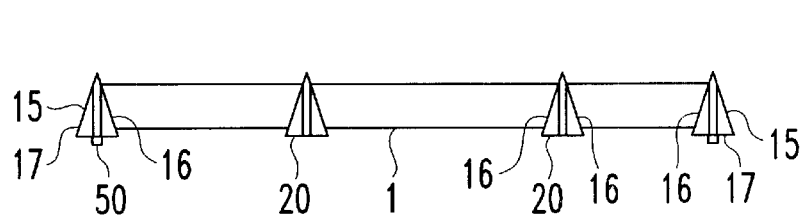
FIG. 2 is a schematic front view of the embodiment of FIG. 1.
Figure 3:
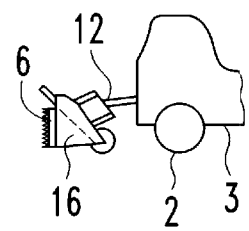
FIG. 3 is a schematic side view of the embodiment of FIG. 1.

DETAILED DESCRIPTION OF THE ILLUSTRATED EMBODIMENTS:

FIG. 1 illustrates a crop divider 1 for separating crop plants on one side of a line of travel LT from those on an opposite side of the line of travel LT and pushing the plants away from the line of travel LT to allow passage of an implement portion, such as the vehicle wheel 2, along a forward travel path TP while reducing contact of the plants with the implement portion.

The crop divider 1 comprises a vertically oriented V-shaped member 2 adapted for mounting on the implement forward of the implement portion from which plants are to be deflected. The V-shaped member 2 has an apex 3 located substantially in the center of the travel path TP and faces forward in the direction of travel T Right and left legs 4R, 4L extend rearward and outward beyond edges 5 of the travel path TP.

A vertically oriented cutter 6 is mounted on a forward edge of the apex 3 of the V-shaped member 2.

Figure 5:
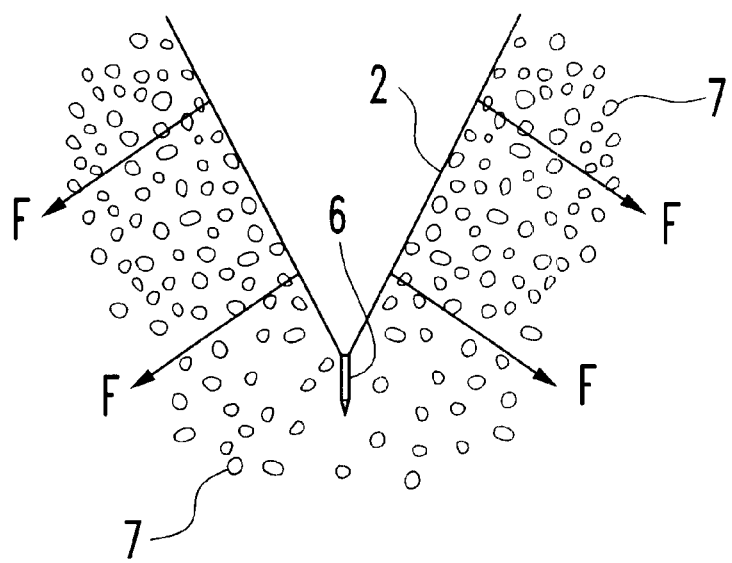
FIG. 5 is a schematic top view of an embodiment moving through crop plants.
Figure 6:
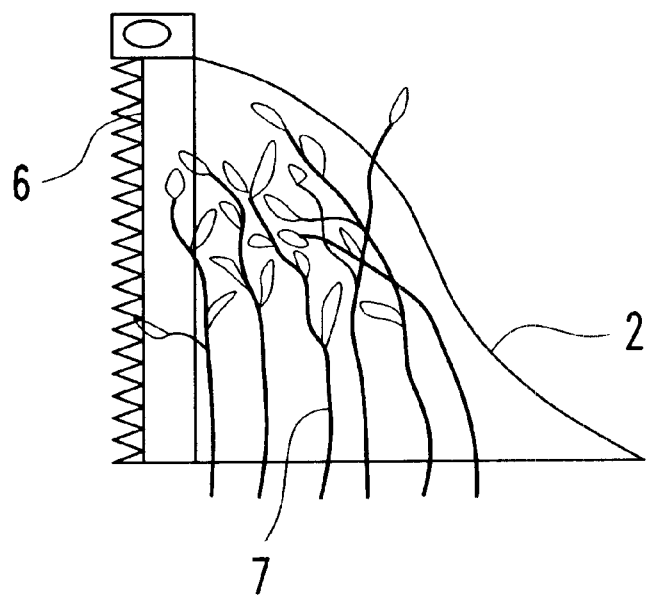
FIG. 6 is a schematic side view of the embodiment of FIG. 5 moving through crop plants.

The action of the crop divider 1 on crop plants 7 is illustrated in FIGS. 5 and 6. The V-shaped member exerts forces F outward and forward in the direction indicated by the arrows as it moves through the plants 7. The forces F are transmitted in a wave ahead of the crop divider 1 by contact of one plant with another with the result that the plants 7 are somewhat sparser at the apex 3 of the V-shaped member 2, and so fewer plants 7 are cut by the cutter 6 than would be cut without the V-shaped member 2.

In the illustrations, the crop divider 1 is incorporated into an apparatus 10 for pushing crops into a lodged position comprising a crop pushing surface 11 inclined down and rearward from a top forward edge 11a to a bottom trailing edge 11b and extending perpendicular to a forward travel direction T from a left end 11F to a right end 11R. The crop pushing surface 11 is mounted on a frame 12 for movement in a forward direction T along the ground by a vehicle 13 mounted behind the frame 12. The crop pushing surface 11 engages with standing crop plants 7 so as to push the plants from a standing position to a lodged position. Such crop pushing apparatuses 10 have been recently developed to prevent shattering prior to harvesting crops such as canola.

Crop dividers 1 in the form of V-shaped end dividers 15 are mounted on the frame 12 forward of the crop pushing surface 11 at the right and left ends 11R, 11F of the crop pushing surface 11. A divider is desired in front of this portion of the implement to define a boundary between crop pushed one way in one implement pass and crop pushed the opposite way on the subsequent implement pass.

Figure 4:
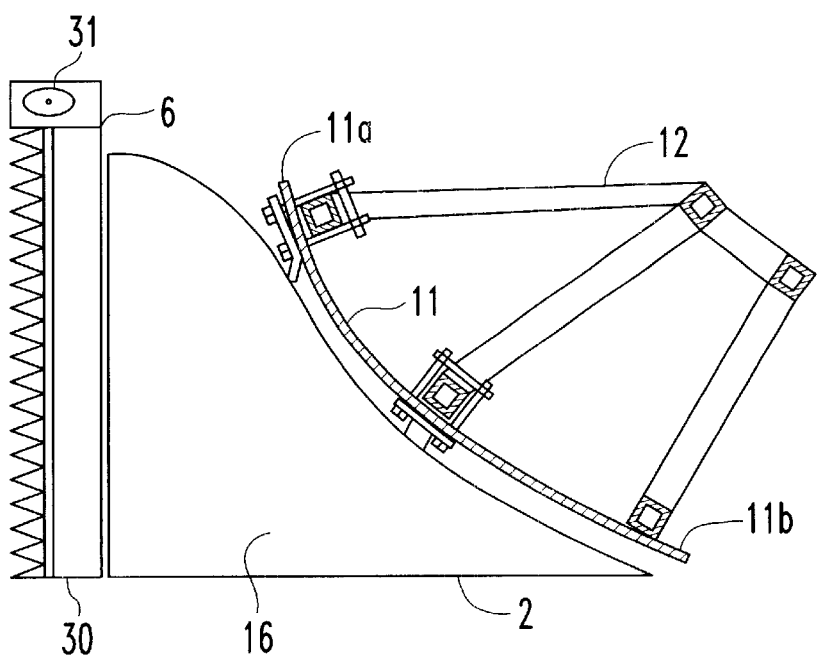
FIG. 4 is a cross-section view as indicated in FIG. 1.
Figure 7:
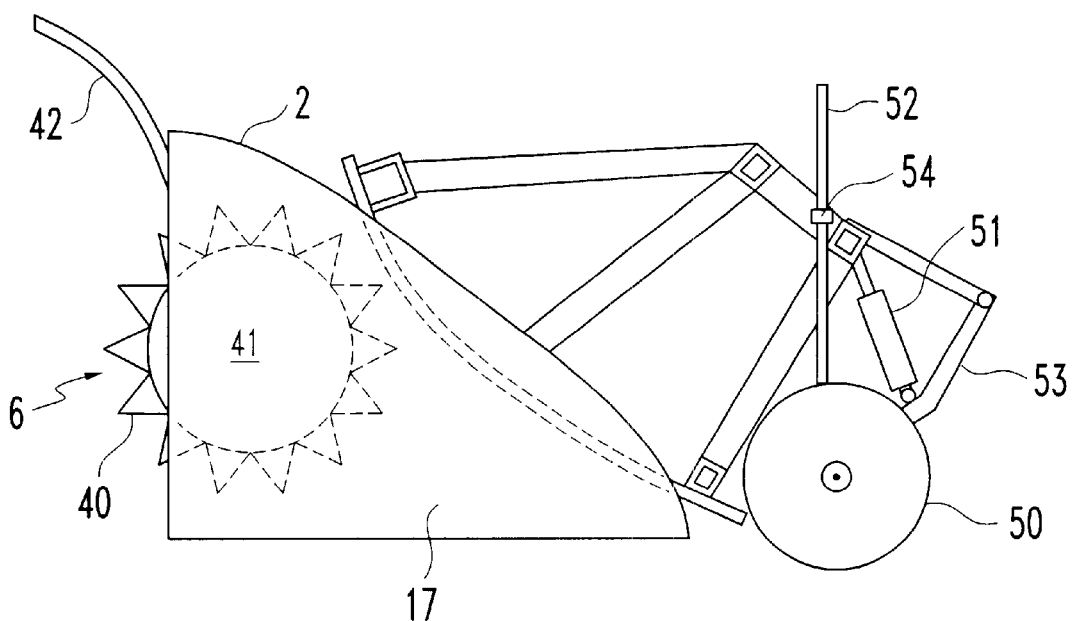
FIG. 7 is a side view of the embodiment of FIG. 1
Figure 8:
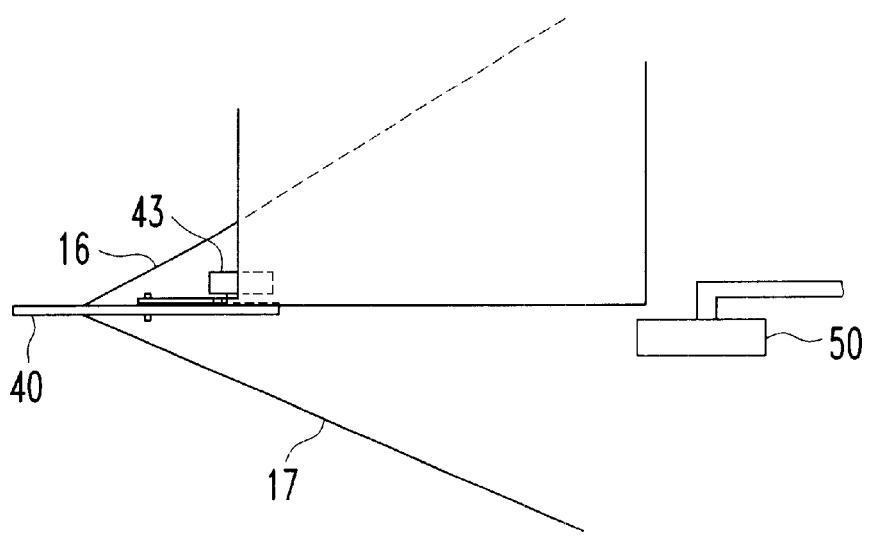
FIG. 8 is a top view of a V-shaped end divider of the embodiment of FIG. 1.

The apex 3 of each V-shaped end divider 15 is located substantially on the respective end 11L or 11L of the crop pushing surface 11. In the V-shaped end dividers 15, the legs are not the same, but rather an inside leg 16 extends rearward in approximate conformity to the crop pushing surface 11 as illustrated in FIG. 4, and an outside leg 17 extends somewhat rearward of the respective end of the crop pushing surface 11, as illustrated in FIG. 7. A vertically oriented V-shaped wheel divider 20 is mounted on the frame forward of each travel path TP of the vehicle wheel 2, each V-shaped wheel divider having an apex 3 located substantially in the center of the respective travel path TP. Right and left legs 16, substantially the same as the inside leg 16 of the V-shaped end divider 15 extend rearward in approximate conformity to the crop pushing surface 11. A vertically oriented cutter 6 is mounted on a forward edge of the apex 3 of each V-shaped end divider 15 and each V-shaped wheel divider 20.

In this application the crop dividers 1 cut the canola that otherwise tangles and bunches on the dividers, and separate the plants 7 so that the vehicle wheels 2 and ends 11R, 11L of the crop pushing surface 11 contact less crop and can pass without damaging the crop or tangling and bunching.

Two alternate vertically oriented cutters are illustrated. In FIG. 4 the cutter 6 is a sickle cutter bar 30 extending from substantially a top of the V-shaped member 2 to a bottom thereof. The sickle cutter bar 30 is driven by a hydraulic motor 31 located at a top end thereof.

In FIG. 7, the cutter 6 is a rotary cutter 40 having a center 41 located at a vertical mid-point of the V-shaped member 2 behind the apex 3 thereof, and further comprises a deflector 42 extending up and forward from a mid-point of the V-shaped member 2 to deflect crop plants into the rotary cutter 40. The rotary cutter 40 is driven by a hydraulic motor 43 located behind the apex 3 and between the legs 16, 17 of the V-shaped member 2.

While the cutter of FIG. 7 shows a hydraulic drive, it will be understood that any other type of drive accomplishing the same object, such as a belt, chain or other drive, is contemplated within the scope of the present invention in addition to the hydraulic drive illustrated.

The angle between the legs of the V-shaped member is greater than 30 degrees, in order to create the forces F sufficient to reduce the number of plants 7 that are cut. The optimum angle can be determined by experimentation, and may be greater than 40 degrees for some crops and conditions.

The illustrated pushing apparatus 10 includes a gauge wheel 50 rotatably mounted on the frame 12 behind each V-shaped end divider 15. The gauge wheel 50 is vertically adjustable from the operator's station on the vehicle 13 by activating the actuator 51. A height indicator 52 is connected to the gauge wheel bracket 53 and slides in frame bracket 54. The height indicator 52 is visible to the operator to indicate the position of the gauge wheel 50 relative to the crop pushing surface 11.

The gauge wheel 50 reduces operator fatigue by allowing the crop pushing surface 11 to rest thereon and float with the contour of the ground. The location behind the V-shaped end dividers 15 allows same to operate without interference from crop plants 7.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention

We claim:

1. A crop divider for separating crop plants on one side of a line of travel from those on an opposite side of the line of travel and pushing the plants away from the line of travel to allow passage of an implement portion along a forward travel path while reducing contact of the plants with the implement portion, the crop divider comprising:

a vertically oriented V-shaped member adapted for mounting on an implement forward of the implement portion, the V-shaped member having an apex extending substantially vertically upward from a lower end of the apex, the apex located substantially in the center of the travel path and facing forward, and right and left legs extending rearward and outward beyond edges of the travel path;

a vertically oriented cutter mounted on a forward edge of the apex of the V-shaped member.

2. The apparatus of claim 1 wherein the cutter is a sickle cutter bar extending from substantially a top of the V-shaped cutter bar to a bottom thereof.

3. The apparatus of claim 2 wherein the sickle cutter bar is driven by a hydraulic motor located at a top end thereof.

4. The apparatus of claim 1 wherein the cutter is rotary cutter having a center located at a vertical mid-point of the V-shaped member behind the apex thereof, and further comprises a deflector extending up and forward from a mid-point of the V-shaped member to deflect crop plants into the rotary cutter.

5. The apparatus of claim 4 wherein the rotary cutter is driven by a hydraulic motor located behind the apex and between the legs of the V-shaped member.

6. The apparatus of claim 1 wherein the angle between the legs of the V-shaped member is greater than 30 degrees.

7. The apparatus of claim 6 wherein the angle between the legs of the V-shaped member is greater than 40 degrees.

8. An apparatus for pushing crops into a lodged position comprising:

a crop pushing surface inclined down and rearward from a top forward edge to a bottom trailing edge and extending perpendicular to a forward travel direction from a left end to a right end therfeof;

the crop pushing surface mounted on a frame for movement in a forward direction along the ground by a vehicle mounted behind the frame to engage the crop pushing surface with a standing crop so as to push the standing crop from a standing position to a lodged position;

a vertically oriented V-shaped end divider mounted on the frame forward of the crop pushing surface at the right and left ends of the crop pushing surface, each V-shaped end divider having an apex located substantially on the respective end of the crop pushing surface and facing forward, an inside leg extending rearward in approximate conformity to the crop pushing surface, and an outside leg extending rearward of the respective end of the crop pushing surface:

a vertically oriented V-shaped wheel divider mounted on the frame forward of each wheel path of the vehicle, each V-shaped wheel divider having an apex located substantially in the center of the respective wheel path and facing forward, and right and left legs extending rearward in approximate conformity to the crop pushing surface;

a vertically oriented cutter mounted on a forward edge of the apex of each V-shaped end divider and each V-shaped wheel divider.

9. The apparatus of claim 8 wherein the cutter is a sickle cutter bar extending from substantially a top of the V-shaped end and wheel dividers to a bottom thereof.

10. The apparatus of claim 9 wherein the sickle cutter bar is driven by a hydraulic motor located at a top end thereof.

11. The apparatus of claim 8 wherein the cutter is rotary cutter having a center located at a vertical mid-point of the V-shaped member behind the apex thereof, and further comprises a deflector extending up and forward from a mid-point of the V-shaped member to deflect crop plants into the rotary cutter.

12. The apparatus of claim 11 wherein the rotary cutter is driven by a hydraulic motor located behind the apex and between the legs of the V-shaped member.

13. The apparatus of claim 8 wherein the angle between the legs of the V-shaped member is greater than 30 degrees.

14. The apparatus of claim 13 wherein the angle between the legs of the V-shaped member is greater than 40 degrees.

15. The apparatus of claim 8 further comprising a gauge wheel rotatably mounted on the frame behind the V-shaped end divider.

16. The apparatus of claim 15 wherein the gauge wheel is vertically adjustable.

17. The apparatus of claim 16 wherein the gauge wheel is vertically adjustable remotely from an operator's station.

18. The apparatus of claim 17 further comprising a height indicator connected to the gauge wheel and visible to the operator to indicate the position of the gauge wheel relative to the crop pushing surface.

\* \* \* \* \*